United States Patent [19]
Perkins et al.

[11] 4,386,625
[45] Jun. 7, 1983

[54] FUEL TRANSFER VALVE

[75] Inventors: Jimmie G. Perkins, Cookeville, Tenn.; Robert E. MacMillan, Andover, Mass.

[73] Assignee: Ex-Cell-O Corporation, Troy, Mich.

[21] Appl. No.: 261,402

[22] Filed: May 7, 1981

[51] Int. Cl.³ ............................................. F16K 11/10
[52] U.S. Cl. ............................ 137/255; 137/627.5; 137/637.1; 137/870
[58] Field of Search ............... 137/627.5, 596, 596.17, 137/255, 599.1, 637.1; 251/133, 357, 870

[56] References Cited

U.S. PATENT DOCUMENTS

| | | | |
|---|---|---|---|
| 2,503,563 | 4/1950 | Ray | 251/133 X |
| 2,959,541 | 11/1960 | Cleary | 137/599.1 X |
| 3,182,951 | 5/1965 | Spencer | 251/357 X |
| 3,478,782 | 11/1969 | Peeples | 137/627.5 |
| 3,948,045 | 4/1976 | Budinski | 137/627.5 |
| 4,128,113 | 12/1978 | Hart | 137/627.5 |

FOREIGN PATENT DOCUMENTS

218506  7/1924  United Kingdom ............. 137/627.5

*Primary Examiner*—Alan Cohan
*Attorney, Agent, or Firm*—John C. Evans

[57] ABSTRACT

A valve system includes features to control flow of fuel between a pair of fuel tanks during a transfer operation so as to prevent flow of return fuel from a carburetor back to a previously filled tank. The valve system includes a pair of valve bodies each having two mechanically operated sealing elements therein. One of the valve bodies has larger inlet and outlet ports to control the supply of fuel from the source tank of the system to a vehicle carburetor. The other of the valve bodies has smaller ports to control the flow of excess fuel flow to the selected source tank of the pair of tanks during engine operation. Each of the valve bodies includes a push rod operatively connected to a single motor drive yoke element. Each sealing element is spring biased and has an insert directed therethrough constituting a seal carrier slidably supported on the push rod.

3 Claims, 7 Drawing Figures

FUEL TRANSFER VALVE

TECHNICAL FIELD

This invention relates to shuttle valves and, more particularly, to fuel tank transfer valves including double plug shuttle valving components for controlling fuel transfer between a main fuel tank and an auxiliary fuel tank in a fuel supply system for a vehicular engine. Fuel systems of this type include plural valving components that will selectively direct flow of fuel from a source tank of the pair of fuel tanks to an engine carburetor and return unused fuel back to the selected source tank.

BACKGROUND ART

Heretofore, valves used to control the flow of gasoline from one of two tanks were solenoid operated. Such arrangements were controlled so that there would be a transitory period during the transfer operation where both of the tanks were communicated with valve return ports. If one of the pair of tanks was filled, the return fuel flow from the carburetor could cause fuel overfill from the tank.

Relevant prior art includes U.S. Pat. No. 2,557,438 issued June 19, 1951 to Johnson showing multiple fuel tank transfer system having solenoid operated, air controllable valves. This system is costly and slow to respond and is not readily adapted for use in mass-produced vehicular fuel tank systems.

U.S. Pat. No. 3,916,938 issued Nov. 4, 1975 to Hack shows an emergency fuel tank transfer system for use on vehicles. It does not include a double shuttle type valve with flow control, and return of unused fuel from a carburetor.

U.S. Pat. No. 4,128,113 issued Dec. 5, 1978 to Hart shows a dual poppet type shuttle valve for use in fluid systems. It requires valve plugs with a ring packing which increases its cost of manufacture and complicates the valve operation. Furthermore, it does not suggest an arrangement for inclusion of plural ones of double shuttle valve plug units in a dual tank truck application.

A fuel recirculating system is set forth in U.S. Pat. No. 2,672,189 issued Mar. 16, 1954 to Welsh. It includes manually operated plug type rotary control valves to select the fuel path from the fuel pump to the carburetor or to select a path from the auxiliary fuel tank 10 back to the carburetor. It does not include any of the component parts or operating principles of the valve of the present invention.

U.S. Pat. Nos. 2,060,735 and 3,332,440 issued Nov. 10, 1936 to Krueger and on July 25, 1967 to Brakebill, respectively, show solid stem double shuttle valve systems for regulating fluid flow between multiple inlets and outlets of a valving structure. Otherwise they do not pertain to the present invention.

DISCLOSURE OF THE INVENTION

The improved valve system of the present invention includes features to control flow of fuel between a pair of fuel tanks during a transfer operation so as to prevent flow of return fuel from a carburetor back to a previously filled tank. The valve system is assembled by use of low cost components and includes a pair of valve bodies each having two mechanically operated sealing elements therein. One of the valve bodies has larger inlet and outlet ports to control the supply of fuel from the source tank of the system to a vehicle carburetor. The other of the valve bodies has smaller ports to control the flow of excess fuel flow to the selected source tank of the pair of tanks during engine operation.

Each of the valve bodies includes a solid central push rod that is operatively connected to a single yoke elements that in turn is reciprocated by a rack and motor driven gear assembly included within a common valve housing. Each one of the solid push rods includes a snap ring fixedly secured thereto and two spring biased rubber type fuel sealing elements that have an insert directed therethrough constituting a low friction seal carrier through which the push rod is telescoped. The snap ring moves back and forth with the push rod in accordance with the drive action of the yoke and rack drive. The snap ring will selectively engage the inserts so as to move one or the other of the fuel sealing elements with respect to a valve seat against spring closing action to control fuel flow between the fuel sealing elements and the aforesaid valve seat. During each seal movement the opposite sealing element is spring biased closed. Alternate rubber fuel seal action will occur following a lost motion of the snap ring upon opposite reciprocation of the solid rod. The rack and pinion which is attached to the yoke has a spring detent position at each end of the valve operating stroke to secure the yoke and connected valves in their control positions.

Movement of the rack and pinion by the electrical drive motor of the assembly is accomplished by completing an electrical circuit for the electric motor through a control system mounted on an instrument panel. Mechanical linkage is provided so that a contact bar and switch arm in the valve housing will be moved in response to operation of the rack and pinion and yoke connections. The switch arm moves to a position on the contact bar to define an indicating light circuit when movement of the rack and pinion is completed through one cycle of drive of the electric drive motor. Reverse movement is accomplished by again completing an external power circuit for the electric motor and moving the switch arm in a reverse direction on the contact bar until another indicating light circuit is completed.

By virtue of the aforedescribed system, a pair of double shuttle valve units are selectively operated by a single yoke through a first drive sequence wherein both of the tanks are initially disconnected from the fuel supply system to the carburetor and then one or the other of the tanks becomes a source tank for the carburetor and at the same time the other of the tanks is continually disconnected from the source tank so that there cannot be a back flow of excess fuel from the carburetor to a source tank when it is initially completely filled at the beginning of a fuel switching operation. As a result, there will be no excessive fill of the tank which can produce an overflow waste of fuel.

It is an object of this invention to provide an improved fuel tank transfer valve system for selectively regulating fuel flow between a main tank and an auxiliary tank of a vehicle fuel supply system and a carburetor for a fuel consuming engine and wherein the valve systems include a pair of tubular valve bodies each including a solid push rod operatively connected to a single yoke and electric motor driven pinion and rack drive system and wherein each of the valve bodies includes a pair of low cost valve sealing elements selectively positioned with respect to valve seats in the valve housing with the sealing elements being carried on low friction inserts and being operatively connected to a snap ring fixedly secured to the solid push rod to produce a selective coupling of the solid rod with the inserts of the system so as to produce a plural mode of valve sealing element positioning including a first mode wherein both of the sealing elements are spring biased against the valve seat; a second mode wherein the snap ring engages one of the inserts to carry the engaged sealing element away from its seal while the push rod easily slides through the other one of the sealing elements and wherein the snap ring and rod will thereafter position that previously opened sealing element to a closed position while the other of the sealing elements remains closed so that fuel flow will be blocked between either one of the tanks and the carburetor so that any excess return fuel flow from the carburetor will not over fill a completely filled one of the tanks during a fuel transfer operation; and thereafter the snap ring is moved by the solid rod to shift the previously closed other one of the valve sealing elements to complete the fuel transfer operation wherein the other of the fuel tanks is the source of fuel for the carburetor.

Another object of the present invention is to provide a valve assembly as set forth in the aforesaid object wherein the valve includes large diameter ports in one of the valve bodies constituting the inlet flow paths from the transfer valve connected tanks to the carburetor and wherein the other of the valve bodies includes smaller diameter valve ports constituting the return flow path from the carburetor back to the other of the tanks that are connected during the transfer operation.

Yet another object of the present invention is to provide an improved low cost shuttle valve for use in multiple tank fuel transfer operations so as to prevent the overflow of fuel from an engine carburetor back to a previously completely filled tank of the multiple tank fuel supply system and to do so by use of an easily assembled valve assembly including a valve housing having a pair of sealed end closures connected in opposite ends thereof and including an intermediate closure wall therein having a pair of valve seats and wherein each of the closure members includes an integrally formed extension that defines a bearing for the solid rod; the solid rod having a snap ring fixedly secured intermediate the ends thereof and having slidable low friction sleeve inserts on either side thereof free to move with respect to the outer surface of the solid push rod; each of the sleeve inserts being located within central bores of rubber sealing elements each having a conoidal surface on one end thereof and a flat surfaced end portion on the opposite end thereof to define a seat for a recoil spring for biasing the rubber sealing element either against the snap ring or against a valve seat depending upon the operative position of the solid push rod.

Yet another object is to provide a valve assembly with an open end housing for use in a fuel transfer valve system wherein a first set of an end closure, biasing spring, spring retainer, rubber sealing element and insert are connected on one side of a control rod for engagement with one surface of a stop ring on the rod to allow insertion of these components as a single assembly through one end of the valve housing and wherein another set of like components is connected to the opposite end of the valve rod for insertion as a single unit through an opposite open end of the valve housing.

Yet another object of the present invention is to provide an improved shuttle valve whereby all the ports of the valve can be simultaneously closed during a valve shifting operation by means of insert carried valving elements located on opposite sides of a stop ring on a solid push rod operator which passes through both of the inserts so as to cause the stop ring to engage one or the other of the inserts that carry the valving elements so as to position them initially in a simultaneously closed position to prevent transfer of fuel from the carburetor back to an initially filled fuel source tank thereby to prevent excessive fuel flow thereto and fuel overflow; followed by opening of one or the other of the valves to complete the fuel transfer operation.

Yet another object of the present invention is to provide a shuttle valve of the type set forth in the preceding object utilizing conventional currently available low cost components that are suitable for standard mass-production manufacturing techniques including insertion of a set of valving components through one end of a valve housing including an "O" ring sealed closure member that will constitute the single end closure of one end of the valve housing and a second set of valving components also including an "O" ring sealed end closure that will constitute the end closure of an opposite open end of the valve housing.

These and other objects and advantages of the present invention will be apparent when reference is made to the following description and accompanying drawings.

BEST MODE OF CARRYING OUT THE INVENTION

Figure 1:
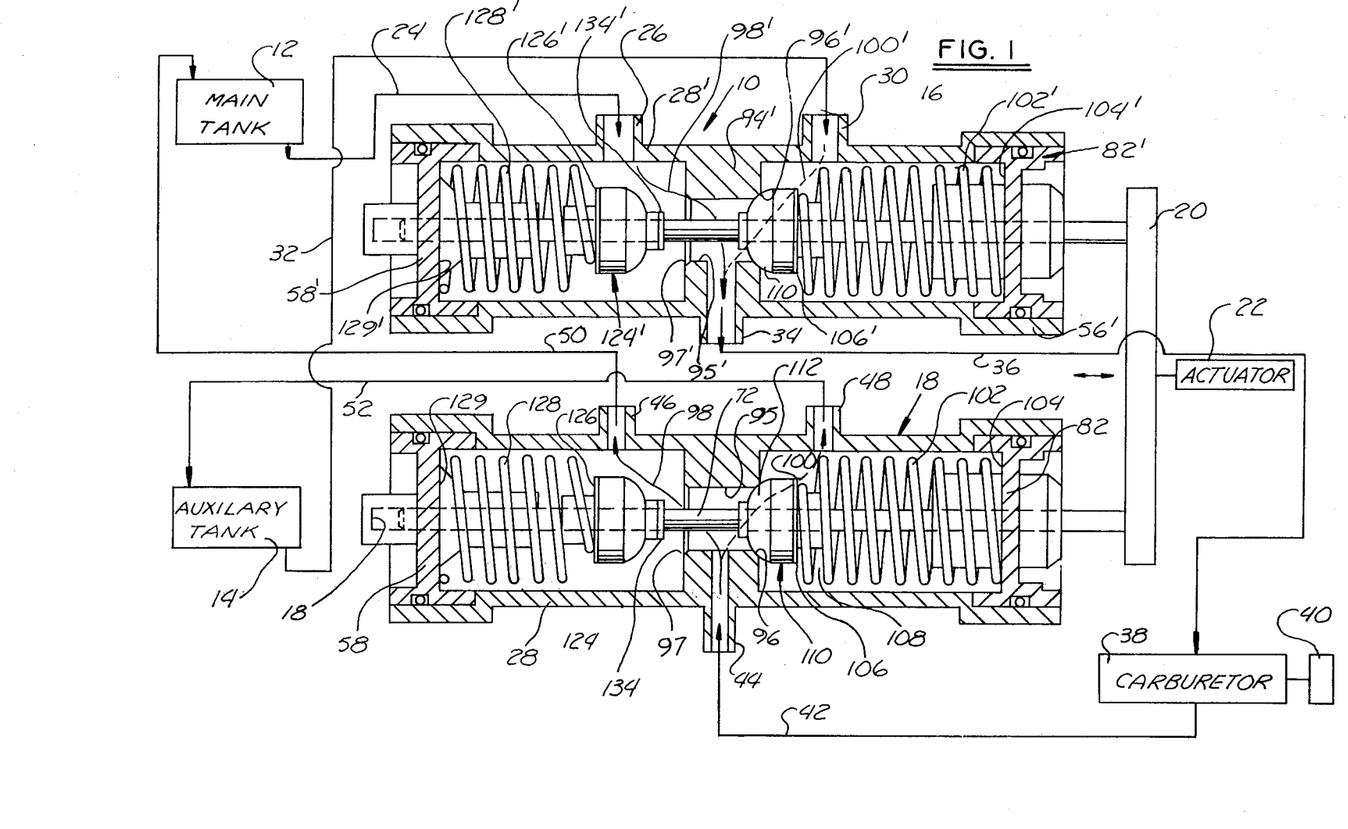
FIG. 1 is a diagrammatic view of a fuel system including the fuel transfer valves of the present invention shown partially in cross section and partially in elevation.

Referring now to FIG. 1 a fuel supply system 10 is illustrated for selectively controlling fuel transfer between a main fuel tank 12 and an auxiliary fuel tank 14. While main and auxiliary fuel designations are set forth in FIG. 1 the invention is for association with plural fuel tanks of any designation which are of the type that can be pre-filled and which can be over filled if return flow from a fuel supply system is inadvertently directed from any point in the system back to the previously fuel filled tank during any phase of the fuel transfer operation.

In accordance with the present invention the prevention of over fill of one or the other of the tanks is controlled by an inlet or supply valve unit 16 which is associated with a return valve unit 18 both of which are driven by a single yoke 20 in accordance with operation of an actuator system 22. In the illustrated arrangement the main fuel tank has an outlet conduit 24 which is in communication with an inlet 26 formed as an integral, outwardly directed tube on an annular body 28' of the inlet valve unit 16. The annular body 28' also includes a second tubular inlet 30 extending therefrom. Inlet 30 is in communication with a conduit 32 that supplies fuel from the auxiliary tank 14. The annular body 28' further includes an outlet fitting 34 therefrom that is connected by a conduit 36 to the inlet of a carburetor 38 for supplying fuel to a fuel consuming engine 40. The carburetor 38 has a return line 42 therefrom that connects to an inlet 44 of the return valve unit 18. Inlet 44 has a smaller diameter than the fittings 26, 30 and 34 through which fuel flows through the inlet valve unit 16. Valve unit 18 has a pair of outlet fittings 46, 48 also of small diameter like the inlet fitting 44 which are connected respectively to a return line 50 to the main tank 12 and a return line 52 to the auxiliary tank 14.

In accordance with certain principles of the present invention each of the valve units 16, 18 is configured to be easily assembled on a mass production basis. The component parts of the return valve 18 will be described and identical valve components found in the inlet valve 16 will be designated with like numerals primed.

Figure 2:
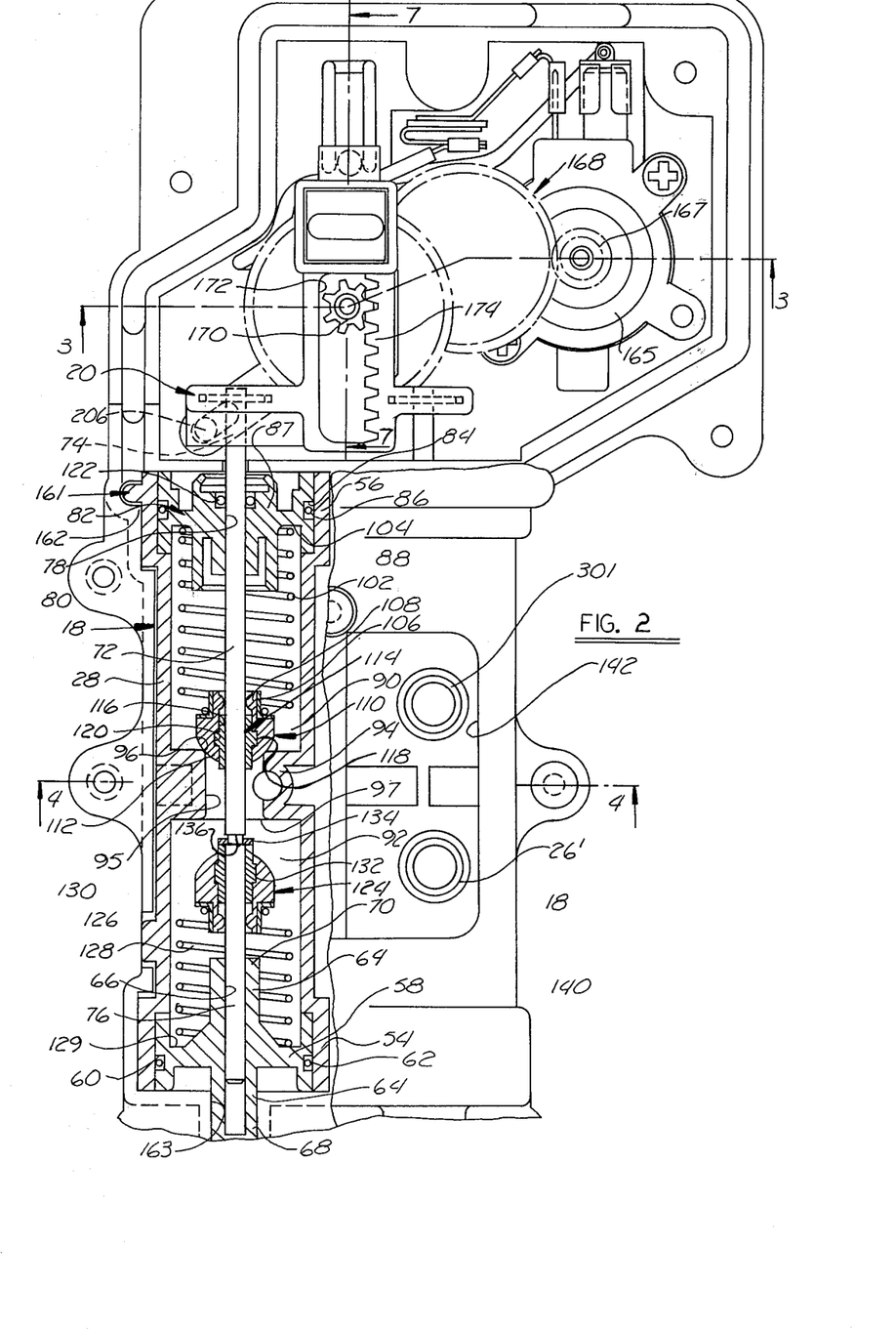
FIG. 2 is a side elevational view of the valve assembly of the present invention with the cover removed therefrom to show the drive components of the valve unit and having a portion of a side wall thereof broken away to show one of the valve assemblies which is partially sectioned and partially in elevation.

Referring now to FIG. 2, the annular body 28 of return valve 18 includes opposite open ends 54, 56. End closure plate 58 is located in the end 54 and includes an annular groove 60 therein for supportingly receiving an "O" ring 62 that sealingly engages the open end 54 of the body 28 to seal against leakage of fuel from the interior of the valve 18. The end closure plate 58 has an integrally formed extension 64 with a central bore 66 formed partially therethrough closed by an end segment 68. The extension includes an inboard segment 70 thereon that defines an elongated bearing for a solid push rod 72 having an outboard end 74 end thereof connected to the yoke 20 and including an inboard end 76 thereon slidably received within the bore 66. The outboard end 74 is directed through a central axial bore 78 formed through an extension 80 formed integrally with an opposite end closure plate 82 that seals the opposite open end 56 of the return valve 18. More particularly the end closure 82 includes an outer peripheral groove 84 therein to support an "O" ring seal 86 to seal against the open end 56 to prevent leakage of fuel from the opposite end of the valve body 28. The extension 80 includes an outboard segment 87 and an inboard segment 88 that defines an elongated bearing for support of the rod 74 as it is reciprocated by the yoke 20. The solid push rod 72 is accurately aligned concentrically with and axially of a pair of fuel supply chambers 90, 92 within the annular valve body 28. The fuel chambers 90, 92 are separated by a partition 94 having a bore 95 formed therethrough in communication with both of the chambers 92 and 90 and having annular, recessed valve seats 96, 97 of beveled form that define valve closure seats on opposite sides of the partition 94. The central bore 95 through the partition 94 is also in communication with the inlet 44 so as to define a first flow path designated by the reference numeral 98 and a second flow path designated by the dotted line flow path 100 in FIG. 1.

In accordance with the present invention the flow paths 98, 100 are selectively opened and closed in a manner so that only one of the paths will remain open at any point of operation of the inlet control valve 16 and the return valve 18 as they control transfer of fuel from either the main tank 12 or the auxiliary tank 14 to the inlet of the carburetor 38.

More particularly, to accomplish this result, the valves 16,18 are of a double shuttle type of improved form that can be assembled by the use of mass production equipment. The valve for controlling the flow through path 100 includes a coiled compression spring 102 having one end thereof seated against the inboard surface 104 of the closure 82 and having the opposite end thereof seated against a metallic ferrule 106 that fits over the end 108 of a resilient rubber-like valve sealing element 110.

In accordance with the present invention the spring 102 will bias the sealing element 110 toward the partition 94 so as to seat a conoidal end 112 of the sealing element into sealing engagement with the beveled seat 96.

The resilient sealing element 110 is slidably supported on the outer surface of the solid rod 72 by a low friction seal insert 114 which is supported within a central bore 116 of sealing element 110 and interlocked thereto by a rib 118 thereon which fits within a groove 120 of the sealing element 110. The insert 114 is preferably formed from a plastic material to easily slide on the outer surface of the solid push rod 72 so that the valving element will readily slide axially of the rod 72 during control valve operation. The rod is sealed with respect to the end closure 82 by an annular "O" ring element 122 that is seated in the outboard end of the closure 82 as best seen in FIG. 2. The aforedescribed components are nested within the fuel chamber 90 of the valve and can be assembled as one subassembly on the rod 72 during manufacturing operation. These units are slipped as a unit into place within the chamber 90 as the end closure plate 82 is located in sealing engagement with the open end 56. Likewise, a second series of axially aligned components can be supported on the inboard end of the push rod 72. As best seen in FIG. 2 they include a resilient sealing element 124 having a spring seat ferrule 126 on one end thereof that supportingly receives one end of a compression spring 128 having the opposite end thereof seated against the inboard surface 129 of the end closure plate 58. The spring 128 is wrapped around the push rod 72 and acts to bias the resilient sealing element 124 against the valve seat 97 formed at the end of the bore 95 through the partition 94. The sealing element 124 is slidably supported for movement on the push rod 72 by a sleeve insert 130 that receives the rod 72. The outer surface of the insert 130 includes a rib 132 that interlocks the insert to the sealing element 124 so that it will move with the insert 132 as will be described.

In accordance with the invention, a snap ring 134 is interlocked to a grooved segment 136 of the rod 72. The snap ring 134 constitutes an abutment surface on the push rod 72 that will be selectively moved either against the exposed end of the insert 114 or the exposed end of the insert 130 depending upon the mode of control of the inlet valve 16.

The second set of valving elements that is associated with the end closure 58 can be assembled from the opposite end of the annular body 28 and located in accurately aligned relationship with the valve seat 97 on the partition 94 as the closure 58 is pressed into sealing engagement with the open end 54 of the valve unit 16.

The supply valve 16 includes like valve components as described in return valve unit 18. Each of these like components is designated with primed reference numerals for ease of reference.

Each of the push rods 72, 72' is connected to the yoke 20 so that axial movement of the yoke 20 will produce concurrent movement of the valve components in the same direction within each of the valve units 16 and 18 in a like manner during movement of the rods 72, 72' both inboard and outboard of the valve bodies 28, 28'.

Figure 3:
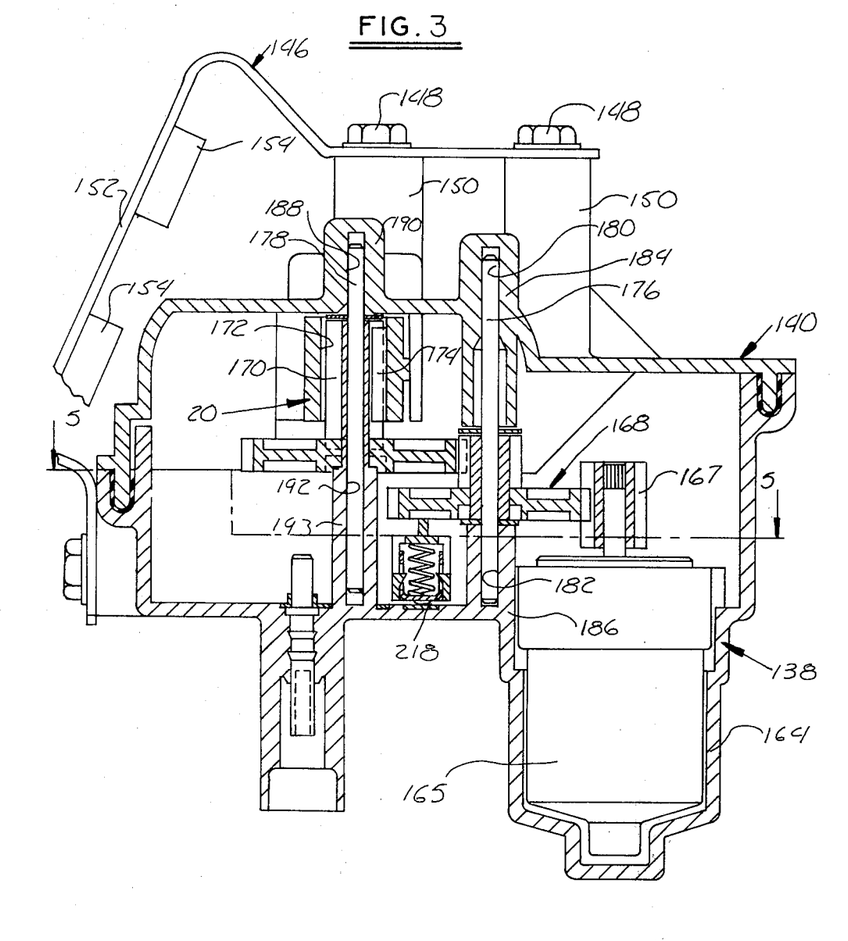
FIG. 3 is a cross sectional view taken along the line 3—3 of FIG. 2 looking in the directions of the arrows and showing the electrical drive motor of the unit in elevation.
Figure 4:
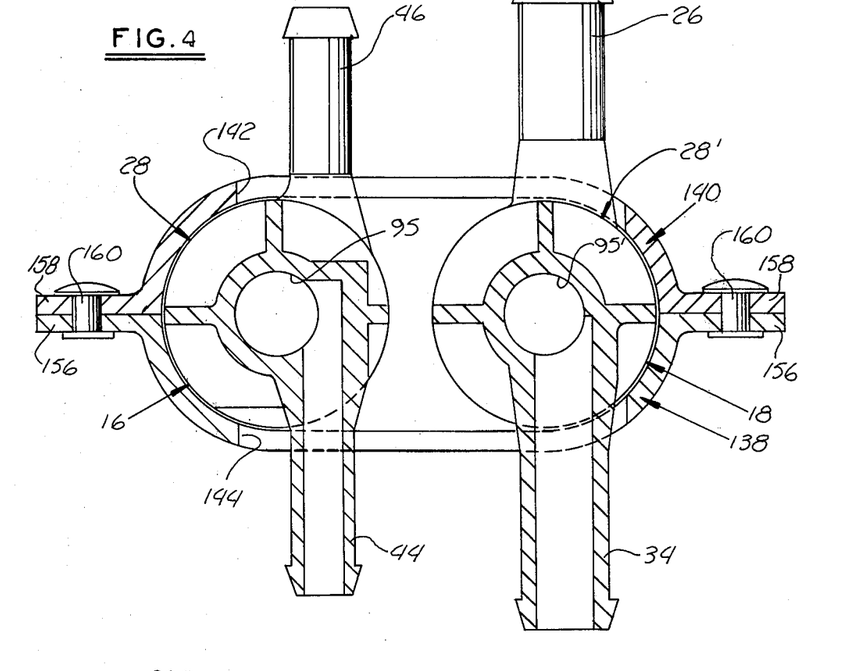
FIG. 4 is a cross sectional view taken along the line 4—4 of the FIG. 2 showing valve housing walls of the valve assembly with the valve bodies in cross section with their operative components removed.

To enable a single yoke 20 to drive both of the valve assemblies or units 16, 18 the units are both packaged in parallel relationship within opposed covers 138, 140 of the valve assembly 10 best shown in FIG. 4. The covers 138, 140 each have a window 142, 144, respectively, formed therein to define access to the various inlet and outlet fittings on the respective valves 16, 18. As shown in FIG. 3, the cover 140 has a support bracket 146 connected thereto by a plurality of screws 148 directed through cover extensions 150 that space a support plate end 152 for connection to a structural portion of the vehicle. The bracket 146 includes nuts 154 thereon through which suitable fasteners can be directed to secure the connector plate 146 in place. The extensions 150 are of a length to provide adequate clearance between the valve units 16 and 18 and the structural support for the valve units so that the conduits can easily be connected to the inlet and outlet fittings on the valve assembly 10.

The relationship of the supported annular bodies 28 of the valves 16 and 18 and the covers 138, 140 are shown in FIG. 4. The covers 138, 148 are joined together at a pair of outwardly directed tabs 156, 158 on either side thereof by suitable fasteners 160.

Figure 7:
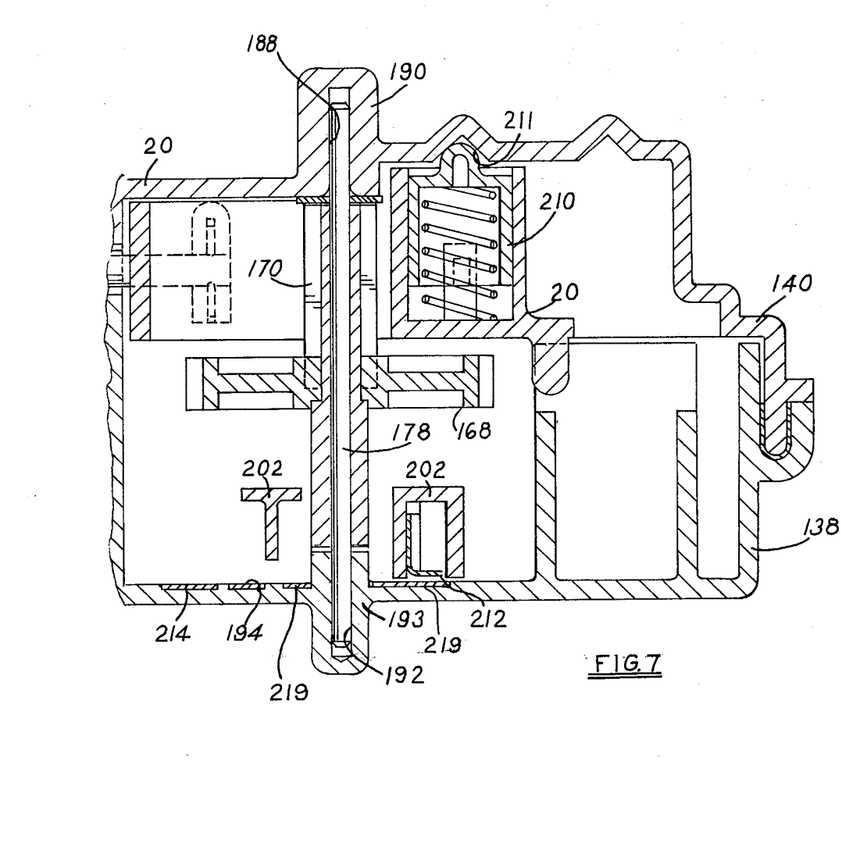
FIG. 7 is an enlarged, fragmentary sectional view taken along the line 7—7 of FIG. 2.

The joined housing covers 138, 140 constitute a fixed support for aligning the push rods 72, 72' of the valve unit 16, 18 with respect to the yoke. A semi-circular flange 161 on valve unit 18 is located in a locating groove 162 formed by covers 138, 140 as shown in FIGS. 2 and 7. Extension 64 on the opposite end of valve 18, as seen in FIG. 2, is seated in cover grooves 163. The housing cover 138 includes a hollow cylindrical segment 164 in which is located an electric drive motor 165 that is selectively energized by a switch assembly 221 to operate the valve units 16, 18. More particularly, as shown in FIGS. 2 and 3, an output pinion 167 connected to the output shaft of the motor 165 is connected through a speed reducing gear set 168 having an output pinion 170 located in an opening 172 of the yoke 20 which, in part, is formed by a rack 174 that is reciprocated by rotation of the pinion 170 during energization of the motor.

The gear set 168 includes a pair of parallel shafts 176, 178 that are aligned vertically with respect to the unit by bores 180, 182 in segments 184, 186 of the covers 138, 140 respectively. Likewise shaft 178 is vertically aligned in parallelism with shaft 176 by a bore 188 in a housing segment 190 on the cover 140 and an aligned bore 192 in a segment 193 of the cover 138. The arrangement, best shown in FIG. 3, is a compact spur gear configuration which defines a positive drive system for the yoke 20 as it concurrently drives the solid push rods 72, 72'.

Figure 5:
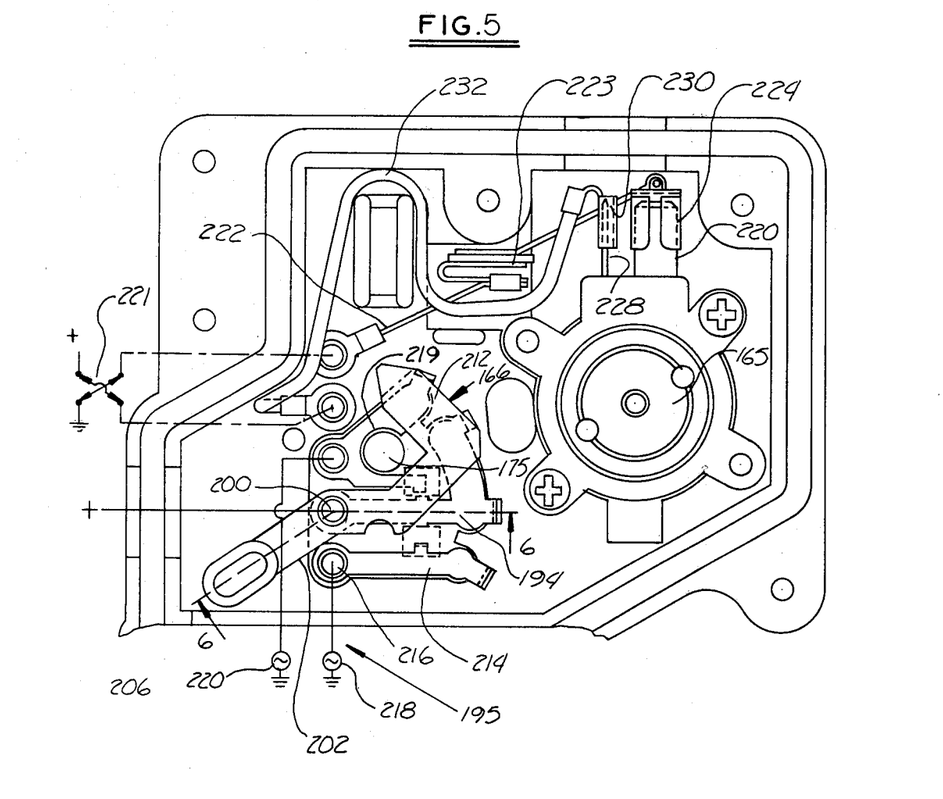
FIG. 5 is a sectional view taken along the line 5—5 of FIG. 3 looking in the direction of the arrows.
Figure 6:
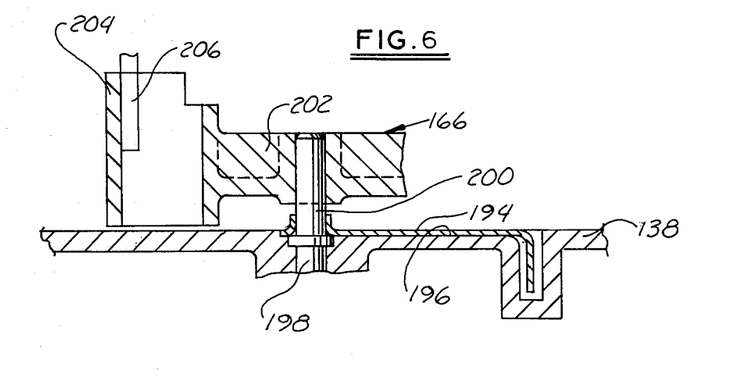
FIG. 6 is a fragmentary enlarged cross sectional view taken along the line 6—6 of FIG. 5 looking in the direction of the arrows.

The electrical power circuit for a lamp indicating circuit 195 is through the switch 166 which includes an input power contact plate or bar 194 that is held against the inboard surface segment 196 of the cover 138 as is best seen in FIGS. 5 and 6. The contact bar 194 is in electrical connection with a supply terminal 198 that is connected at the inboard end 200 thereof to a plastic switch arm 202. The switch arm pivots with respect to the axis of the end 200 and includes a slotted end 204. A drive shaft 206 on yoke 20 is directed through an opening 208 in end 204 of the arm 202 as is best seen in FIG. 5. A detent assembly 210 fixes the axial position of the axial movement of the yoke 20 as produced by energization of the drive motor 165.

An electrically conductive bridge segment 212 on the end of the switch arm 202 is shifted in detented position 211 of yoke 20 to bridge the power contact bar 194 and an auxiliary contact plate 214. Plate 214 is connected to the inside surface 196 of the cover 38 by an electrically conductive terminal 216 that completes an energization path for an instrument panel lamp 218 indicating position of the valving units 16, 18 to communicate the auxiliary tank with the carburetor. The bridging segment 212 of the switch arm 202, when in the position as shown in FIG. 5, will connect the input power contact plate 194 with the main tank contact plate 219 so as to complete an energization circuit for an instrument panel lamp 220.

The motor energization circuit is completed from a dash mounted switch 221 through an electrical lead 222 that is connected to a PTC thermistor 223 that overload protects the motor. A clip terminal 224 from thermistor 223 connects to the power connection 226 to the motor. The motor further includes a terminal 228 thereon connected by an electrical clip terminal 230 to an electrically conductive wire 232 as shown in FIG. 5.

The valve units 16, 18 have a first operating mode or control position wherein the main tank is connected to the carburetor 38 for both inlet of fuel to the carburetor 38 and the return of fuel flow therefrom. This mode of operation is illustrated in FIG. 1 wherein the snap ring 134, 134' on each of the shafts 72, 72' is positioned by the actuator to engage the respective inserts 130, 130' to lift the valve sealing elements 124, 124' from their respective valve seats. At this point fuel is directed from the main tank through the aforedescribed circuits and through the flow paths 98 to the carburetor 38. At the same time any excess fuel flow through from the carburetor 38 is returned through the valve 18 through the fuel flow path 98' back to the main tank 12. During this time the valve elements 110, 110' are maintained closed by their associated compression springs.

To produce this mode of operation the electric drive motor is energized so as to rotate the pinion 170 in a direction to cause the yoke 20 to be shifted inboard of the covers 138, 140 as shown on FIG. 2.

Reference to the fuel gage of the vehicle will indicate the quantity of fuel in the main tank. It will serve as the source supply for the carburetor 38 until the fuel gage for the main tank 12 indicates that it is empty or an empty main tank 12 is indicated by a stuttering of the engine of the vehicle.

Actuation of the valves 16, 18 to a fuel transfer position wherein the main tank is disconnected and the auxiliary tank is connected is accomplished by reversing electric power to the motor 165 through switch 221. This completes the electric motor energization across the terminals 226, 228 of the drive motor 165. As the motor turns, the gear train 168 will move the rack and pinion assembly and the switch arm 202 which is coupled thereto by the shaft 206. When the yoke 20 is in a second detent position 234 shown on cover 140 in FIG. 7, the switch arm 202 and contact bar 194 complete an energization circuit for the auxiliary tank lamp 218. The valve units 18, 16 will have push rods 72, 72' pulled outwardly of the annular bodies 28, 28'. As this occurs, the snap ring 134,134' will initially move from the position shown in FIG. 1 and will be carried by the push rod which freely pulls through both of the inserts with little resistance, until the springs 128, 128' will push the resilient seals 124, 124' against the valve seats 97, 97'. This seals the supply valve fittings 26, 30, 44 and the return valve fittings 34, 46, 48, before any transfer of fuel will occur from the auxiliary tank to the carburetor 38. As soon as the valve sealing elements 124, 124' are seated, the snap ring will travel through a lost motion represented by a part of the length of the bore 95. The push rods 72, 72' during this period of operation are sliding through the inserts and following a delayed period the snap rings will engage the end of the insert which is coupled to the valving elements 110, 110'. They will be forced by the snap rings against the action of their respective springs 102, 102' and through the fuel chamber 90, 90' to open fuel paths 100, 100'. The other fuel chamber 92, 92' will be completely sealed. As a result, the inlet valve 16 will transfer fuel from the auxiliary tank 14 to the carburetor 38 and any excess fuel will flow therefrom through the return valve 18 of the fuel supply system 10 back to the auxiliary tank.

By virtue of the aforedescribed control movements of the respective valving elements 124, 124' and 110, 110' and the time delay of contact of the snap rings 134, 134' there is an assured prevention of overflow of fuel from the fuel system back to the tank which is being transferred into the system as the main source tank. For example, when the main tank 12 is emptied, typically in a dual system, the auxiliary tank 14 will be completely filled at the start of the transfer of fuel. Because of the aforedescribed action of the valves the return of fuel from the main tank is completely terminated before the auxiliary tank is opened to the system. As a result any tendency for return fuel flow from the carburetor to overfill the auxiliary tank 14 is eliminated and as a result there will be no fuel overflow from the system.

There can be operating modes in a dual tank system wherein fuel flow initially is from the auxiliary tank at which point the valving components will be shifted in an opposed relationship to that shown in FIG. 1 by operation of the motor and shifting movement of the snap ring 134 described in the immediately preceding paragraphs. In this case, when the auxiliary tank is emptied, a dash mounted switch will be closed to energize the drive motor to cause it to rotate the pinion 170 in a direction to cause the yoke 20 to be moved in a direction toward the valving units 16, 18 which will cause the solid push rods 72, 72' to be moved inwardly of the valve units 16, 18. Upon initial movement the valves 124, 124' will be maintained closed as the push rods slide through the inserts of the valving elements. The snap ring will carry the opened valve elements 110, 110' toward the valve seats 96, 96' until they are in engagement and held in sealed relationship therewith by the coil springs 102, 102' so as to close fuel flow through the fuel paths 100 and 100' during movement of the push rods through a valve closed position in which all of the valving elements 110, 110', 124, 124' are spring biased closed. As this occurs the other valving elements 124, 124' are maintained closed. There will be a time delay during which the snap ring 134 traverses the bore 95 in a reverse direction as was described in the previous fuel transfer operation. Eventually the snap rings 134, 134' will traverse the bores 95, 95' to lift the valving elements 124 and 124' from their respective valve seats so as to open fuel flow from the main tank to the fuel system. As in the previous case, there is no chance for return flow from the system to pass into the filled main tank as the auxiliary tank is transferred from the system.

INDUSTRIAL APPLICABILITY

It is apparent from the foregoing that the invention provides an improved, easily assembled valve assembly for use in dual tank fuel systems to prevent fuel overflow during tank transfer operations.

While a preferred embodiment is shown, other modifications thereof are possible.

What is claimed is:

1. A dual fuel tank transfer valve system for selectively regulating fuel flow between a main tank and an auxiliary tank of a vehicle fuel supply system for a fuel burning engine comprising a pair of tubular valve bodies each including multiple fittings defining plural flow paths through said body, a push rod located within each body, a single yoke means coupled to each push rod for simultaneously reciprocating said push rods in the same direction during inboard and outboard movements and through a valve closed position intermediate first and second control positions, electric motor driven gear means operatively connected to said yoke means, means defining valve seats in each of said valve bodies, a pair of valve sealing elements selectively positioned with respect to said valve seats, means for carrying each of said sealing elements including a pair of sleeve inserts slidably supported on each of said push rods and a ring fixedly secured to each of said push rods, spring means to produce selective opposite engagement of said inserts with said ring when said push rods are in said first and second control positions, said ring on the push rod being spaced from said inserts when in the valve closed position whereby all of said sealing elements are spring biased closed against said valve seats, said ring being positioned on the inboard and outboard movements to engage one of the inserts to carry a previously seat engaged sealing element away from its seat while a push rod slides through a seated other one of the sealing elements thereon and wherein the ring and push rod will thereafter position a previously opened sealing element to a closed position to complete a fuel flow path between one or the other of the tanks and the fuel supply system, both of the sealing elements remaining closed at the valve closed position whereby fuel flow will be blocked between either one of the tanks and the carburetor to prevent tank overflow during a fuel transfer operation.

2. In the combination of claim 1, one of said valve bodies including large diameter ports constituting part of inlet flow paths from the tanks and wherein the other of the valve bodies includes smaller diameter valve ports constituting part of return flow paths from the carburetor back to the tanks.

3. In a shuttle valve for use in multiple tank fuel transfer operations operative to prevent the overflow of fuel from an engine carburetor back to a previously completely filled tank of a multiple tank fuel supply system, the combination of a pair of valve bodies, each of the bodies having: opposite open ends, a pair of sealed end closures connected in said opposite ends an intermediate closure wall therein having a pair of valve seats, each of the closure members including an integrally formed extension that defines a bearing, a push rod slidably supported by said bearings for reciprocation with respect to said body, said rod having a ring fixedly secured intermediate the ends thereof, a slidable sleeve insert on either end of said rod free to move with respect to its outer surface, a pair of resilient sealing elements each having a surface on one end thereof and a flat surfaced end portion on the opposite end thereof to define a spring seat, each of the sleeve inserts carrying one of said sealing elements on said rod, and spring means for biasing each of the sealing elements either against the ring or against a valve seat depending upon the operative position of the push rod; yoke means coupled to each push rod for simultaneously reciprocating said push rods in the same direction during inboard and outboard movements and through a valve closed position intermediate first and second control positions, and means for producing a lost motion movement of said ring with respect to either insert of simultaneously seated sealing elements whereby fuel flow will be blocked between the tanks and the carburetor to prevent tank overflow during a fuel transfer operation.

* * * * *